US011974371B2

(12) United States Patent
Wang et al.

(10) Patent No.: US 11,974,371 B2
(45) Date of Patent: Apr. 30, 2024

(54) LIGHT-EMITTING DIODE DRIVER AND LIGHT-EMITTING DIODE DRIVING DEVICE

(71) Applicant: NOVATEK MICROELECTRONICS CORP., Hsinchu (TW)

(72) Inventors: Yu-Hsiang Wang, Zhubei (TW); Che-Wei Yeh, Hsinchu (TW); Keko-Chun Liang, Hsinchu (TW); Yong-Ren Fang, Kaohsiung (TW); Yi-Chuan Liu, Zhubei (TW)

(73) Assignee: NOVATEK MICROELECTRONICS CORP., Hsinchu (TW)

( * ) Notice: Subject to any disclaimer, the term of this patent is extended or adjusted under 35 U.S.C. 154(b) by 0 days.

(21) Appl. No.: 17/388,748

(22) Filed: Jul. 29, 2021

(65) Prior Publication Data

US 2022/0039231 A1 Feb. 3, 2022

Related U.S. Application Data

(60) Provisional application No. 63/058,480, filed on Jul. 29, 2020.

(51) Int. Cl.
*H05B 45/33* (2020.01)
*G09G 3/32* (2016.01)

(52) U.S. Cl.
CPC ............... *H05B 45/33* (2020.01); *G09G 3/32* (2013.01)

(58) Field of Classification Search
CPC ............. G09G 3/32; G09G 2310/0286; G09G 2310/0275; G09G 2310/027; G09G 2370/08; H05B 45/33
See application file for complete search history.

(56) References Cited

U.S. PATENT DOCUMENTS

| | | | |
|---|---|---|---|
| 5,023,891 | A | 6/1991 | Johnson, III |
| 5,245,635 | A | 9/1993 | Martinez et al. |
| 9,699,009 | B1 | 7/2017 | Ainspan et al. |
| 2021/0049952 | A1 | 2/2021 | Yeh et al. |

FOREIGN PATENT DOCUMENTS

| | | | | | |
|---|---|---|---|---|---|
| CN | 101365274 | A | * | 2/2009 | |
| CN | 104064150 | A | | 9/2014 | |
| CN | 106877873 | A | | 6/2017 | |
| CN | 108063661 | A | | 5/2018 | |
| CN | 110191539 | A | | 8/2019 | |
| CN | 111416600 | A | | 7/2020 | |
| CN | 112399663 | A | | 2/2021 | |
| CN | 113192457 | A | * | 7/2021 | ............... G09G 3/32 |
| RU | 197284 | U1 | * | 4/2020 | |

* cited by examiner

*Primary Examiner* — Henry Luong
(74) *Attorney, Agent, or Firm* — MARSHALL, GERSTEIN & BORUN LLP

(57) ABSTRACT

A light-emitting diode LED driver and a LED driving device including the LED driver are provided. The light-emitting diode LED driver includes a decoding circuit that receives a data signal and decodes the data signal to generate display data used to drive LEDs to emit light and display and a recovered clock signal. Further provided is an encoding circuit that encodes the decoded display data by using the recovered clock signal to generate an encoded data signal, where the data signal is encoded in a first encoding format, and the encoded data signal is encoded in a second encoding format.

17 Claims, 12 Drawing Sheets

LIGHT-EMITTING DIODE DRIVER AND LIGHT-EMITTING DIODE DRIVING DEVICE

TECHNICAL FIELD

The present disclosure generally relates to a field of display, and in particular to a light-emitting diode (LED) driver and a LED driving device including the LED driver.

BACKGROUND

Generally, cascaded LED drivers are used in a LED display system to drive LEDs for display. Serial peripheral interfaces (SPIs) are generally used between the cascaded LED drivers, and each LED driver needs to set a data signal pin for receiving data signal and a clock signal pin for receiving clock signal, where the data signal pin and the clock signal pin are independent. This is because not only a data signal line is needed for data transmission, but also a common clock signal line is needed to transmit clock signal, so that the received clock signal may be used to sample the data. In other words, separate clock signal line and corresponding hardware pin need to be set between the cascaded LED drivers to transmit clock signal separate from the data signal, so that the LED display system can work normally. As shown in FIG. 1, a common clock signal line is set between the respective cascaded LED drivers 1, 2, . . . N, to provide a clock signal SCLK for each stage of LED driver.

SUMMARY OF THE DISCLOSURE

According to an aspect of the present disclose, an LED driver is proposed, comprising: a decoding circuit that receives a data signal and decodes the data signal to generate display data used to drive LEDs to emit light and display and a recovered clock signal; and an encoding circuit that encodes the decoded display data by using the recovered clock signal to generate an encoded data signal, wherein the data signal is encoded in a first encoding format, and the encoded data signal is encoded in a second encoding format, wherein the first encoding format and the second encoding format are different encoding formats.

Optionally, according to the above LED driver, at least one of the first encoding format and the second encoding format is one of a Manchester encoding format and a four-level pulse amplitude modulation PAM4 encoding format.

Optionally, according to the above LED driver, when the first encoding format is the Manchester encoding format, the decoding circuit may comprise: a first delay circuit that delays a timing of the received data signal to generate a first recovered data signal; a first sampling circuit that samples the received data signal to generate a second recovered data signal; and a first logic operation circuit that performs a logic operation on the first recovered data signal and the second recovered data signal to generate the decoded display data and the recovered clock signal; wherein the first sampling circuit samples the received data signal by using the recovered clock signal.

Optionally, according to the above LED driver, the first delay circuit may delay the received data signal by 1/4 period to generate the first recovered data signal.

Optionally, according to the above LED driver, the first sampling circuit may comprise: a second delay circuit that receives the recovered clock signal generated by the first logic operation circuit, and delays the recovered clock signal by 1/2 period to generate a sampling clock signal; and a first register that samples the received data signal by using the sampling clock signal to generate the second recovered data signal.

Optionally, according to the above LED driver, the first logic operation circuit may comprise: a first logic gate circuit that performs an exclusive OR operation on the first recovered data signal and the second recovered data signal to generate the recovered clock signal; and a second logic gate circuit that inverts the second recovered data signal to generate the decoded display data.

Optionally, according to the above LED driver, when the second encoding format adopts the Manchester encoding format, the encoding circuit may comprise: a first data conversion circuit that converts the decoded display data by using a first clock signal obtained from the recovered clock signal to generate first converted data; a second sampling circuit that samples the first converted data to generate second converted data; and a second logic operation circuit that performs a logic operation on the second converted data and a second clock signal obtained from the recovered clock signal to generate the encoded data signal.

Optionally, according to the above LED driver, the first data conversion circuit may comprise: a first frequency dividing circuit that divides the received recovered clock signal to generate a second clock signal, and outputs the second clock signal as a first clock signal; a second register that samples the decoded display data by using the first clock signal, and outputs first sampled data; a third register that samples the decoded display data by using a signal that is inverted from the first clock signal, and outputs second sampled data; and a data selector that receives the first sampled data and the second sampled data, and selects, based on a level of the first clock signal, one of the first sampled data and the second sampled data as the first converted data and outputs it to the second sampling circuit.

Optionally, according to the above LED driver, the first data conversion circuit may comprise a first frequency dividing circuit that divides the received recovered clock signal to generate a second clock signal; a phase delay circuit that performs phase delay on the second clock signal output by the first frequency dividing circuit, and outputs the phase-delayed second clock signal as the first clock signal; a second register that samples the decoded display data by using the first clock signal, and outputs first sampled data; a third register that samples the decoded display data by using a signal that is inverted from the first clock signal, and outputs second sampled data; and a data selector that receives the first sampled data and the second sampled data, and selects, based on a level of the first clock signal, one of the first sampled data and the second sampled data as the first converted data and outputs it to the second sampling circuit.

Optionally, according to the above LED driver, the first sampled data is output from a second data output terminal of the second register, and the second sampled data is output from a first data output terminal of the third register.

Optionally, according to the above LED driver, the second sampling circuit may comprise: a fourth register that samples the first converted data by using a signal that is inverted from the recovered clock signal, and outputs the second converted data.

Optionally, according to the above LED driver, the second logic operation circuit may comprise: a third logic gate circuit that performs an exclusive OR operation on the second clock signal output by the first frequency dividing circuit and the second converted data to generate the encoded data signal.

Optionally, according to the above LED driver, when the first encoding format adopts the PAM4 encoding format, the decoding circuit may comprise: a preprocessing circuit that preprocesses the received data signal and outputs a preprocessed data signal; a comparator circuit that compares the preprocessed data signal with a corresponding threshold signal to generate a corresponding bit thermometer code; a PAM4 decoder that decodes the bit thermometer code and outputs a decoded data signal.

Optionally, according to the above LED driver, the comparator circuit may comprise: a first comparator, a second comparator and a third comparator, wherein the first, second and third comparators set different threshold signals, and compare the preprocessed data signal with the different threshold signals, respectively, to generate corresponding bit thermometer codes.

Optionally, according to the above LED driver, the decoding circuit may further comprise a clock recovery circuit and a second data conversion circuit, wherein the clock recovery circuit receives a bit thermometer code output from one of the first, second and third comparators, extracts the recovered clock signal therefrom and outputs it to the second data conversion circuit; the second data conversion circuit converts the decoded data signal output by the PAM4 decoder by using the recovered clock signal to generate the decoded display data in binary form.

Optionally, according to the above LED driver, the second data conversion circuit may comprise: a fifth register and a sixth register that sample the decoded data signal output by the PAM4 decoder by using the recovered clock signal, to output third sampled data and fourth sampled data respectively as the decoded display data in binary form.

Optionally, according to the above LED driver, when the first encoding format adopts the PAM4 encoding format and the second encoding format adopts the Manchester encoding format, the decoding circuit may further comprise: an interface circuit that receives the third sampled data and the fourth sampled data, and selects one of the third sampled data and the fourth sampled data as the decoded display data based on a level of the recovered clock signal.

According to another aspect of the present disclosure, a light-emitting diode LED driving device is proposed, comprising N stages of LED drivers connected in series, wherein a first stage of LED driver receives an initial data signal and outputs a first stage of data signal, a k-th stage of LED driver receives a (k−1)-th stage of data signal output by a (k−1)-th stage of LED driver and outputs a k-th stage of data signal, $1<k\leq N$.

With the LED driver and the corresponding LED driving device proposed in the present disclosure, it is no longer necessary to transmit clock signals separately, but embed a clock signal into a data signal by corresponding encoding of the data signal transmitted between various stages of LED drivers, thereby eliminating hardware settings for separate transmission of clock signals between various stages of LED drivers, reducing wiring complexity of a printed circuit board, and reducing the cost of a product; in addition, power consumption and electromagnetic interference of the LED driving device may also be reduced, thereby improving display quality of the LED.

DESCRIPTION OF THE EMBODIMENTS

Figure 1:
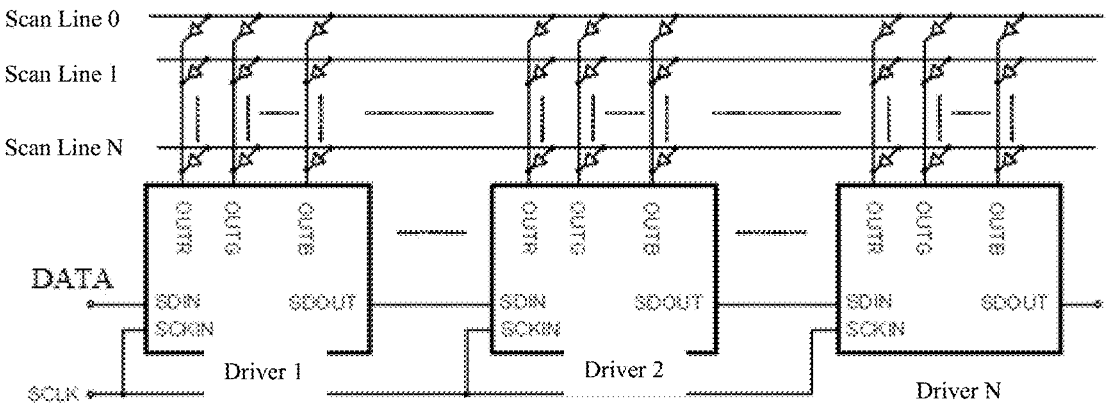
FIG. 1 shows a schematic architecture of a conventional LED driving device.

The subject matter will now be described with reference to the accompanying drawings, in which like reference numerals are used throughout the description to refer to like elements. In the following description, for the purpose of explanation, many specific details are set forth in order to provide a thorough understanding of the subject matter. However, it is obvious that the present principle may also be implemented without these specific details.

This specification illustrates principles of the present disclosure. Therefore, it should be understood that, although not explicitly described or illustrated herein, those skilled in the art may design various configurations embodying the principles of the present disclosure.

The principles are naturally not limited to embodiments described herein.

FIG. 1 shows a schematic architecture of a conventional LED driving device. As shown in FIG. 1, transmission interfaces adopt Serial Peripheral Interfaces (SPIs), a data signal DATA and a clock signal SCLK are input to a LED driver 1, by way of cascade connection, the driver 1 transmits the data to a driver 2, the driver 2 then transmits the data to a driver 3, and so on. After all the driver 1-N circuits have received the data, the data DATA is synchronously output to a LED display system to display a picture. In addition, a common clock signal line is also connected between various stages of LED drivers in the cascade, so that a clock signal SCLK may be received, and each stage of LED driver samples the received data signal DATA by using the clock signal SCLK.

Figure 2A:
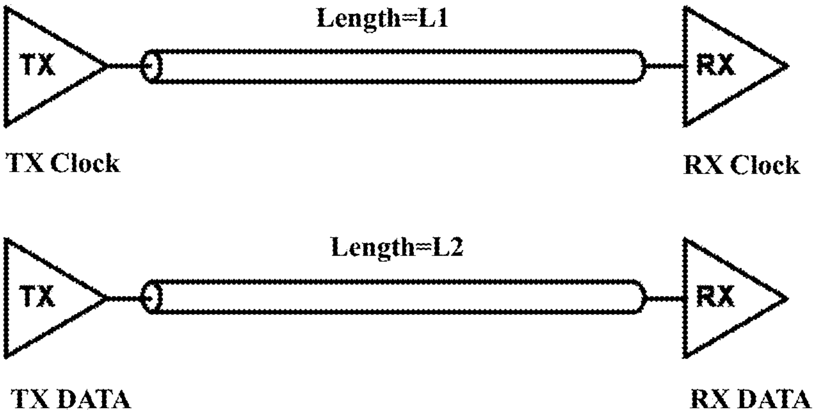
FIGS. 2A-2C show sampling problems that may be caused by transmitting a clock signal and a data signal with different transmission paths.
Figure 2B:
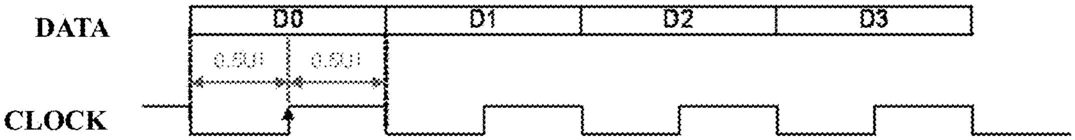
Figure 2C:
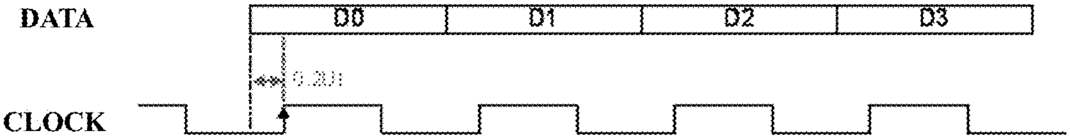

Since the clock signal and the data signal are transmitted by different transmission paths, this may cause problems. FIGS. 2A-2C show sampling problems that may be caused by clock signals and data signals transmitted different transmission paths.

As shown in FIG. 2A, clock signal and data signal are respectively transmitted between a transmitting end and a receiving end through two transmission paths. If for some reasons, for example, printed circuit board (PCB) wiring is improper due to process or materials, when a length L1 of the path for transmitting the clock signal is not equal to a length L2 of the path for transmitting the data signal, loss of sampling time or holding time at the receiving end will be caused. As shown in FIG. 2B, suppose that the transmitting end transmits a set of data signals and clock signals, in order to ensure that there is the best sampling time and holding time when the data signal is sampled by using the clock signal, for example, the ideal best sampling time and holding time are both 0.5 UI. However, due to the mismatch between the transmission paths L1 and L2, an actual timing of data signal and clock signal arriving at the receiving end is shown in FIG. 2C. In this case, there will be 0.2 UI sampling time left and 0.3 UI sampling time is lost.

To this end, according to the principles of the present disclosure, by encoding data to be transmitted, a clock signal is embedded in an encoded data signal, so that only the encoded data signal is transmitted between various stages of LED drivers without the need to provide an additional clock signal, eliminating impact on accuracy and stability of data sampling caused by a possible mismatch between different transmission paths which are set to transmit data signals and clock signals, respectively.

Figure 3:
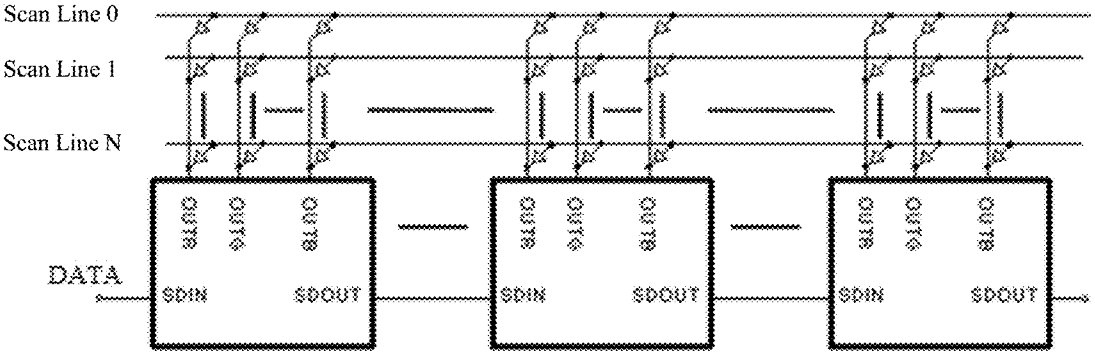
FIG. 3 shows a schematic architecture of a LED driving device according to an embodiment of the present disclosure.

FIG. 3 shows a schematic architecture of an LED driving device according to an embodiment of the present disclosure. Compared with the conventional LED driving device shown in FIG. 1, independent provision of clock signal to various stages of LED driver is eliminated, and instead, encoded data signal is transmitted between the various stages of LED drivers, and data and clock signals may be recovered by decoding the encoded data signals.

Figure 4:
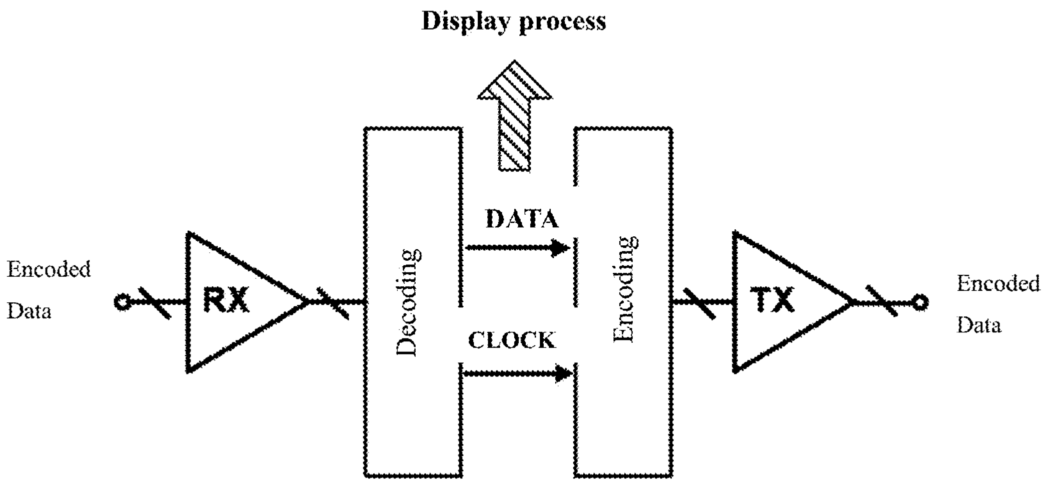
FIG. 4 is a schematic block diagram of a LED driver according to an embodiment of the present disclosure.

FIG. 4 shows a schematic block diagram of a single-stage LED driver that may be used in the LED driving device shown in FIG. 3 according to an embodiment of the present disclosure. As shown in FIG. 4, the LED driver includes a decoding circuit that receives a data signal, and decodes the data signal to generate display data DATA for driving LEDs to emit light and display and a recovered clock signal CLK; and an encoding circuit that encodes the decoded display data by using the recovered clock signal to generate an encoded data signal, where the data signal is encoded in a first encoding format, and the encoded data signal is encoded in a second encoding format.

FIG. 4 also shows that a receiver RX receives an encoded data signal from the external, for example, receives an encoded data signal from a previous stage of LED driver or from a controller, and transmits the encoded data signal to a next stage of LED driver via a transmitter TX.

Optionally, a first stage of LED driver may also directly receive a data signal without any encoding.

Figure 5:
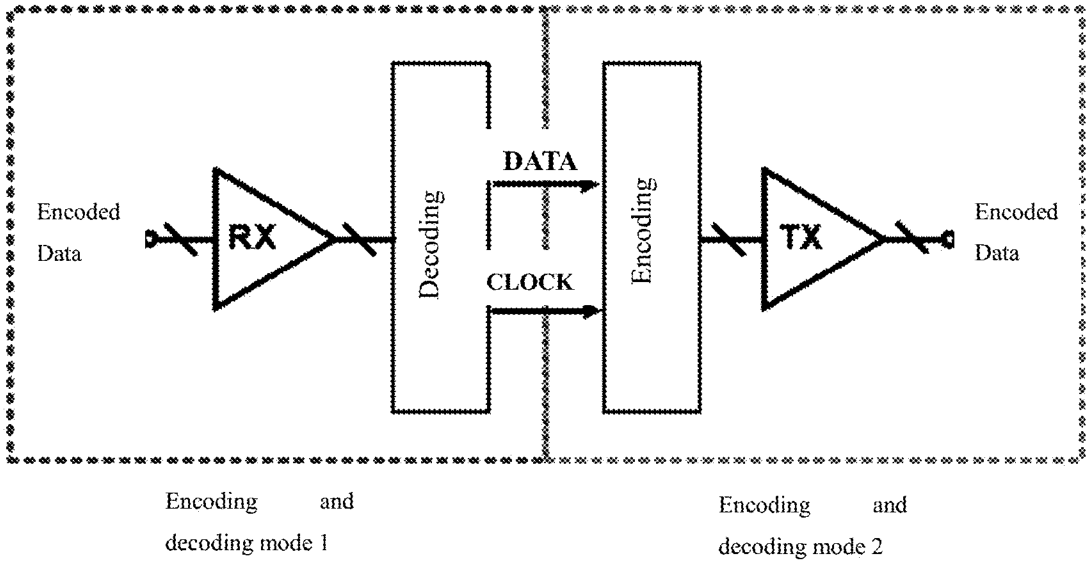
FIG. 5 is a schematic block diagram of a LED driver according to another embodiment of the present disclosure.

Optionally, according to the embodiments of the present disclosure, multiple encoding and decoding modes may be used in the single-stage LED driver. FIG. 5 is a schematic block diagram of an LED driver according to an embodiment of the present disclosure. For example, as shown in FIG. 5, a receiver RX may receive a data signal encoded in a first encoding mode, and decode it by using a first decoding mode to generate decoded data DATA and recovered clock signal CLK; then the decoded data DATA may be encoded by an encoder using a second encoding mode so as to generate an encoded data signal which is then transmitted to a next stage of LED driver via the transmitter RX, and a receiver of the next stage of LED driver decodes the received encoded data signal in a corresponding decoding mode.

The LED driver and driving device using the principles of the present disclosure may achieve the following advantages:

For example, due to elimination of separate transmission of clock signal, clock signal line and corresponding hardware pins set between various stages of LED drivers are eliminated accordingly, which may reduce wiring complexity of a printed circuit board, save the number of layers used in the printed circuit board, and reduce the cost of the printed circuit board.

In addition, by encoding data signal to be transmitted using a certain encoding mode, there is no need to transmit clock signal separately, power consumption and electromagnetic interference of the driving circuit may be reduced, a chip area may be decreased and the cost of chip packaging may be reduced.

In addition, if different encoding and decoding modes are used at transmitting and receiving ends of various stages of LED drivers, for example, if different encoding and decoding modes are cross-mixed, since data streams are transmitted in different forms at the same time and using different bandwidths, the benefits of further reducing electromagnetic interference may be achieved.

Figure 6:
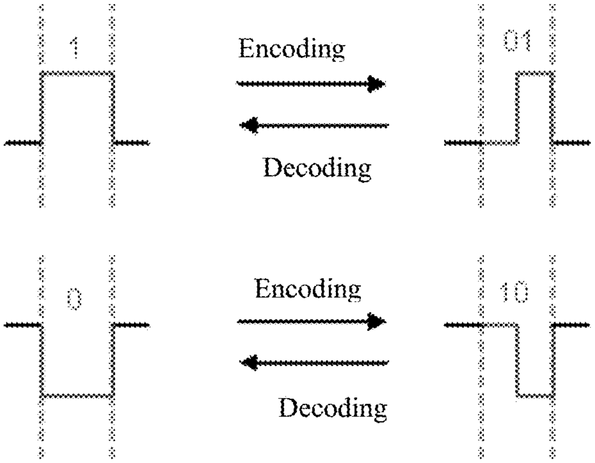
FIG. 6 is a schematic diagram of encoding and corresponding decoding of a data bit according to an embodiment of the present disclosure.
Figure 7:
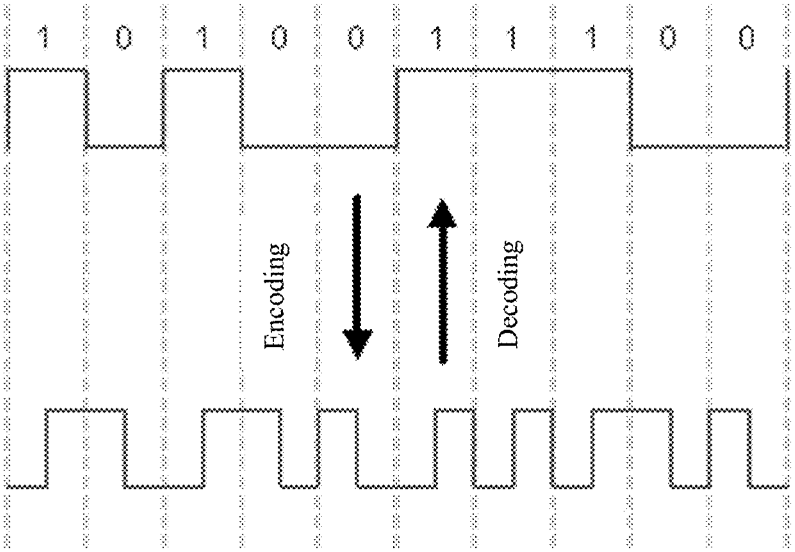
FIG. 7 is a schematic diagram of encoding and corresponding decoding of a data stream according to the encoding mode shown in FIG. 6.

According to the principles of the present disclosure, it is proposed to encode data signal to be transmitted by using a certain encoding mode, without the need to separately transmit clock signal between various stages of LED drivers. Since a clock signal is embedded in a data signal, the sampling clock signal and data are recovered by the receiving end, and thus it will not cause deviation of SCLK and DATA in the transmission process, and will not adversely affect synchronization characteristics of the clock signal and the data. FIG. 6 is a schematic diagram of encoding and corresponding decoding of a data bit according to an embodiment of the present disclosure. As shown in FIG. 6, for example, a Manchester encoding mode may be adopted to encode a data bit "1" in a data signal (for example, a data stream) as "01", and a data bit "0" as "10". Correspondingly, when the data signal is received, a corresponding decoding mode is adopted, for example, "01" is decoded as a data bit "1", and "10" is decoded as a data bit 0. FIG. 7 is a schematic diagram of encoding a data stream according to the encoding mode shown in FIG. 6 and decoding data bits from the encoded data signal.

FIGS. 8A-8D are schematic diagrams of encoding and corresponding decoding of two consecutive data bits using different encoding modes according to another embodiment of the present disclosure.

Figure 8A:
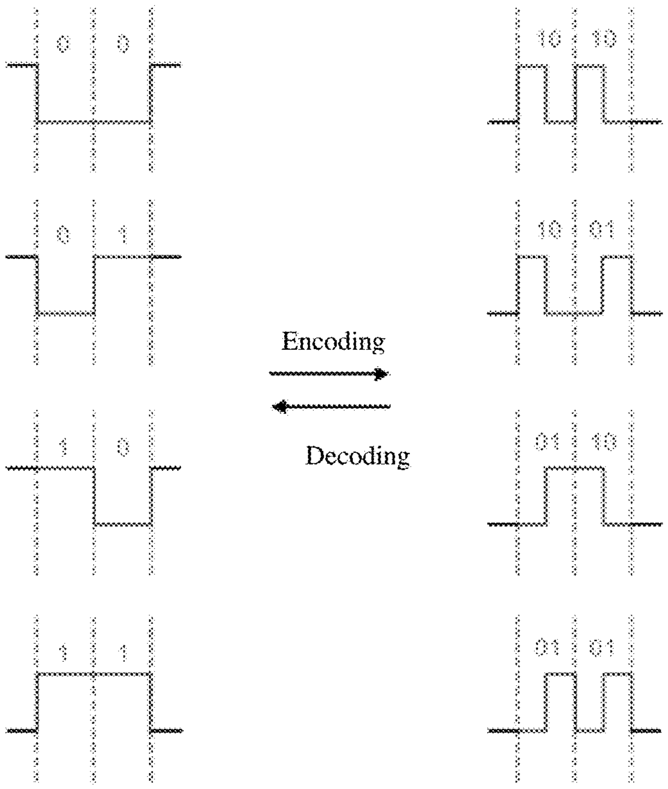
FIGS. 8A-8D are schematic diagrams of encoding and corresponding decoding of two consecutive data bits using different encoding modes according to an embodiment of the present disclosure.

For example, according to an embodiment, as shown in FIG. 8A, when a data stream is encoded before transmission, two consecutive data bits "00" are encoded as "1010", two consecutive data bits "01" are encoded as "1001", two consecutive data bits "10" are encoded as "0110", and two consecutive data bits "11" are encoded as "0101", and then encoded data signal is transmitted to a next stage. Correspondingly, when the encoded data signal is received, a corresponding decoding mode is adopted to decode "1010" into two consecutive data bits "00", "1001" into two consecutive data bits "01", "0110" into two consecutive data bits "10", and "0101" into two consecutive data bits "11".

Figure 8B:
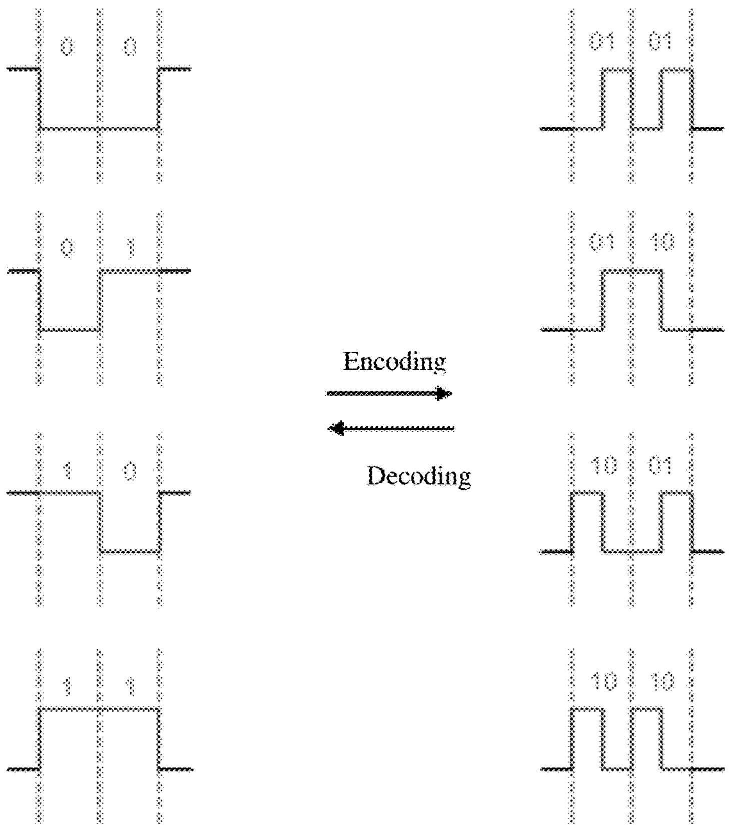

Optionally, according to another embodiment, as shown in FIG. 8B, when a data stream is encoded before transmission, two consecutive data bits "00" are encoded as "0101", two consecutive data bits "01" are encoded as "0110", two consecutive data bits "10" are encoded as "1001", and two consecutive data bits "11" are encoded as "1010", and then encoded data signal is transmitted to a next stage. Correspondingly, when the encoded data signal is received, a corresponding decoding mode is adopted to decode "0101" into two consecutive data bits "00", "0110" into two consecutive data bits "01", "1001" into two consecutive data bits "10", and "1010" into two consecutive data bits "11".

Figure 8C:
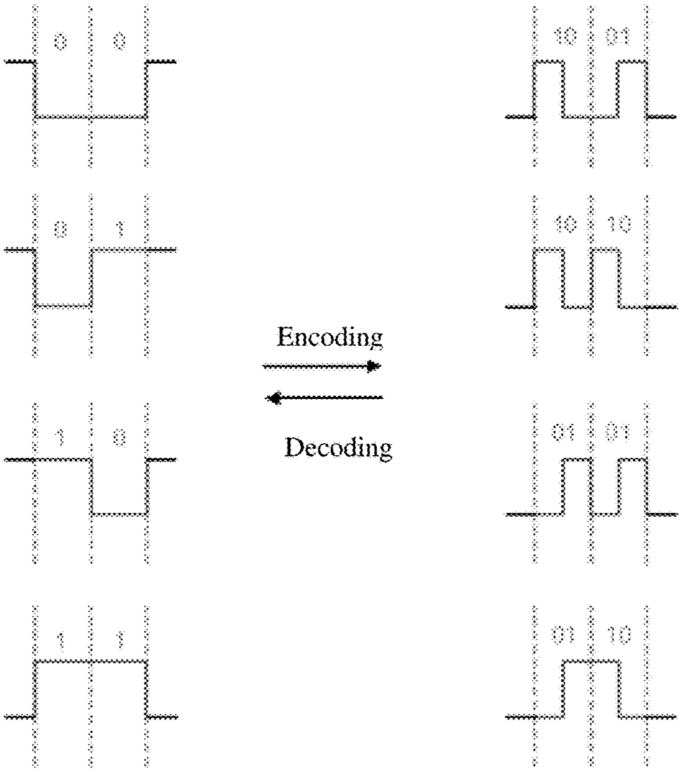

Optionally, according to yet another embodiment, as shown in FIG. 8C, when a data stream is encoded before transmission, two consecutive data bits "00" are encoded as "1001", two consecutive data bits "01" are encoded as "1010", two consecutive data bits "10" are encoded as "0101", and two consecutive data bits "11" are encoded as "0110", and then encoded data signal is transmitted to a next stage. Correspondingly, when the encoded data signal is received, a corresponding decoding mode is adopted to decode "1001" into two consecutive data bits "00", "1010" into two consecutive data bits "01", "0101" into two consecutive data bits "10", and "0110" into two consecutive data bits "11".

Figure 8D:
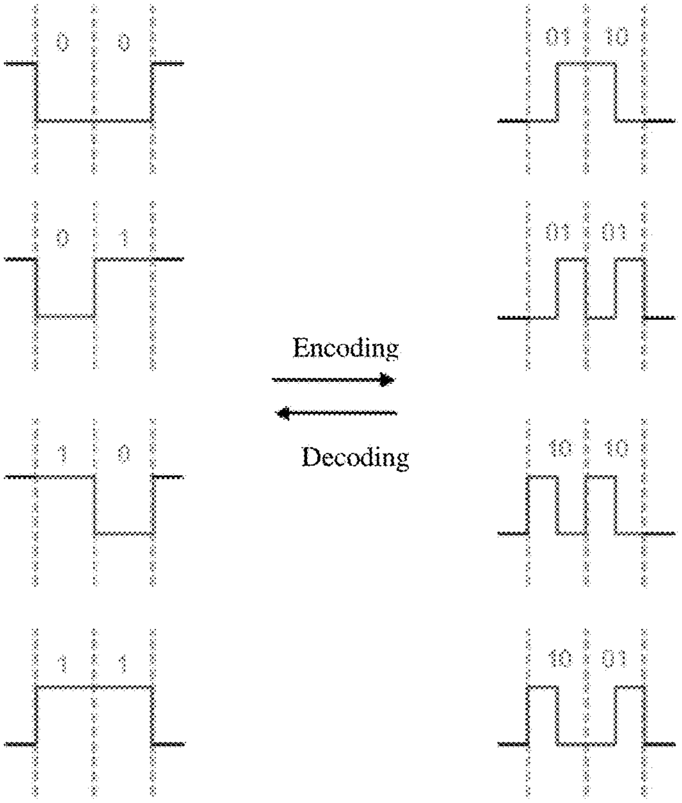

Optionally, according to yet another embodiment, as shown in FIG. 8D, when a data stream is encoded before transmission, two consecutive data bits "00" are encoded as "0110", two consecutive data bits "01" are encoded as "0101", two consecutive data bits "10" are encoded as "1010", and two consecutive data bits "11" are encoded as "1001", and then encoded data signal is transmitted to a next stage. Correspondingly, when the encoded data signal is received, a corresponding decoding mode is adopted to decode "0110" into two consecutive data bits "00", "0101" into two consecutive data bits "01", "1010" into two consecutive data bits "10", and "1001" into two consecutive data bits "11".

Figure 8E:
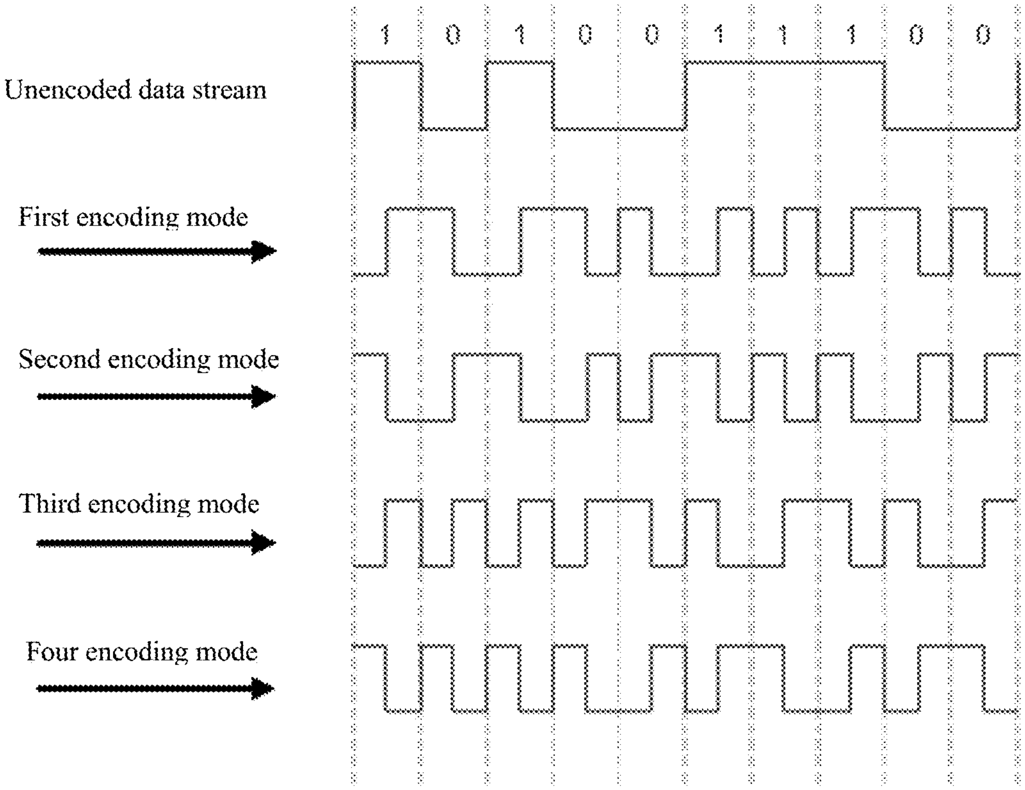
FIG. 8E is a schematic diagram of encoding and corresponding decoding of a data stream according to the different encoding modes shown in FIGS. 8A-8D.

FIG. 8E is a schematic diagram of respectively encoding a data stream according to the four encoding modes shown in FIGS. 8A-8D. In addition, as described above, if different encoding and decoding modes are used at transmitting and receiving ends of various stages of LED drivers, for example, if different encoding and decoding modes are cross-mixed, for example, the four encoding and decoding modes shown in FIGS. 8A-8D are cross-mixed, since data streams are transmitted in different forms at the same time and using different bandwidths, the benefit of further reducing electromagnetic interference may also be achieved.

Figure 9:
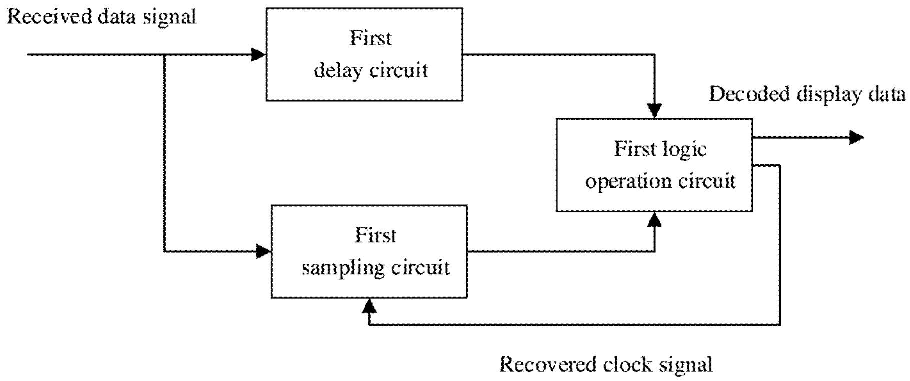
FIG. 9 is a schematic block diagram of a decoding circuit in a LED driver according to an embodiment of the present disclosure.

FIG. 9 shows a schematic block diagram of a decoding circuit in an LED driver according to an embodiment of the present disclosure. The decoding circuit shown in FIG. 9 may be used to decode a received data signal encoded by the Manchester encoding mode, and recover data DATA and a clock signal therefrom. As shown in FIG. 9, the decoding circuit includes: a first delay circuit that delays a timing of a received data signal to generate a first recovered data signal; a first sampling circuit that samples the received data signal to generate a second recovered data signal; and a first logic operation circuit that performs a logic operation on the first recovered data signal and the second recovered data signal, to generate decoded display data and a recovered clock signal; where the first sampling circuit samples the received data signal by using the recovered clock signal.

According to an embodiment of the present disclosure, the first delay circuit delays the received data signal by a 1/4 period to generate the first recovered data signal.

Optionally, the first sampling circuit includes: a second delay circuit that receives the recovered clock signal generated by the first logic operation circuit, and delays the recovered clock signal by 1/2 period to generate a sampling clock signal; and a first register that samples the received data signal by using the sampling clock signal to generate the second recovered data signal.

Optionally, the first logic operation circuit includes: a first logic gate circuit that performs an exclusive OR operation on the first recovered data signal and the second recovered data signal to generate the recovered clock signal; and a second logic gate circuit that inverts the second recovered data signal to generate the decoded display data.

Figure 10A:
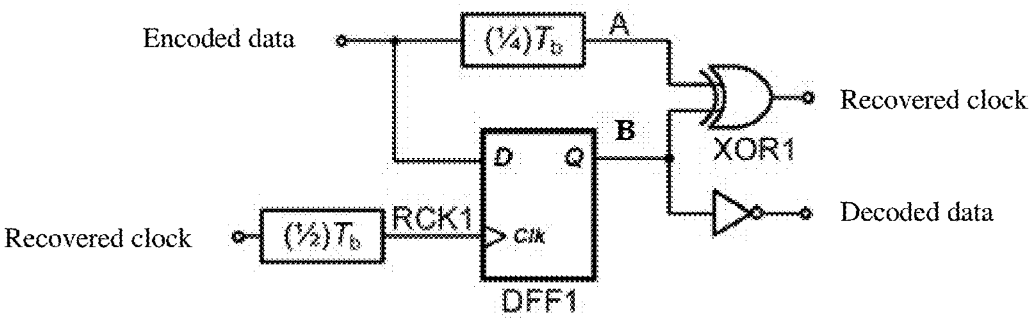
FIGS. 10A-10B are schematic diagrams of a decoding circuit and a corresponding signal timing in a LED driver according to an embodiment of the present disclosure.

As an example, FIG. 10A shows a schematic diagram of a specific structure of a decoding circuit in an LED driver according to an embodiment of the present disclosure.

As shown in FIG. 10A, after receiving the encoded data signal, the first delay circuit delays the encoded data signal by 1/4 period ((1/4)Tb, where Tb indicates period of the encoded data signal) to generate the first recovered data signal A; the first sampling circuit (DFF1) samples the received encoded data signal to generate the second recovered data signal B; the first logic gate circuit (XOR1) of the first logic operation circuit performs an "exclusive OR (XOR)" logic operation on the first recovered data signal A and the second recovered data signal B to generate the recovered clock signal; the second logic gate circuit of the first logic operation circuit inverts the second recovered data signal B to generate the decoded display data.

Optionally, as shown in FIG. 10A, the second delay circuit of the first sampling circuit receives the recovered clock signal generated by the first logic operation circuit, and delays the recovered clock signal by 1/2 period ((1/2)Tb, where Tb indicates period of the encoded data signal) to generate the sampling clock signal RCK1; and the first register DFF1 of the first sampling circuit samples the received data signal by using the sampling clock signal RCK1 to generate the second recovered data signal B.

Figure 10B:
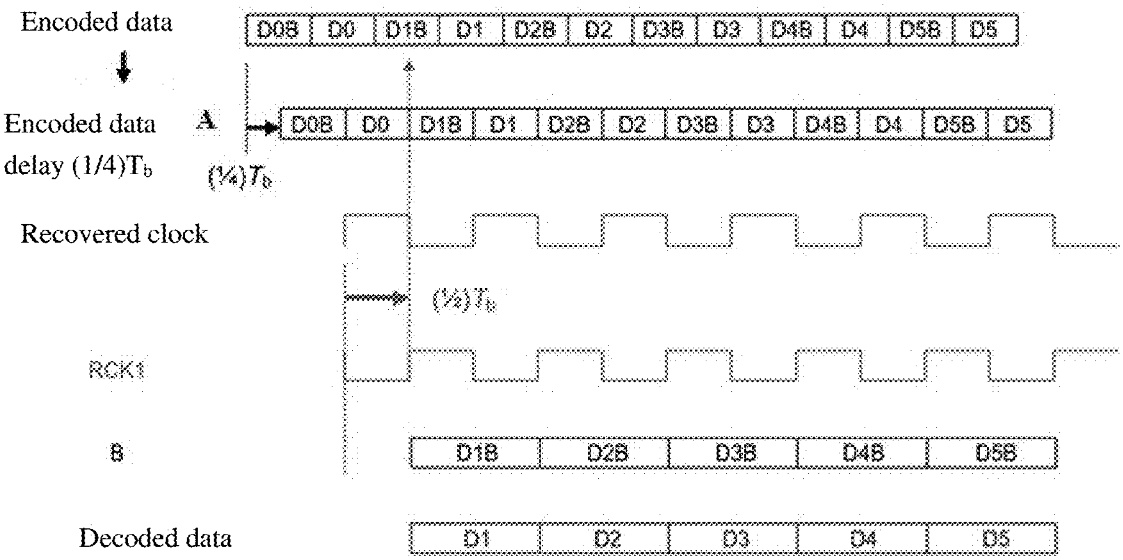

FIG. 10B is a schematic diagram showing a timing of corresponding signals corresponding to the decoding circuit shown in FIG. 10A. As shown in FIG. 10B, the received encoded data signal is delayed by 1/4 period to obtain the first recovered data signal A; the first recovered data signal A and the second recovered data signal B output by the first register DFF1 undergo an exclusive OR operation to obtain the recovered clock signal; and the recovered clock signal is delayed by 1/2 period to obtain the sampling clock signal RCK1, where the second recovered data signal B is obtained by the first register DFF1 sampling the received encoded data signal using a rising edge of the sampling clock signal RCK1, and the second recovered data signal B is inverted by the logic gate to obtain the decoded data. As an example, in the data signal shown in FIG. 10B, D0B, D1B, D2B, D3B, D4B, and D5B represent inverted bits of data bits D0, D1, D2, D3, D4, and D5.

Figure 11:
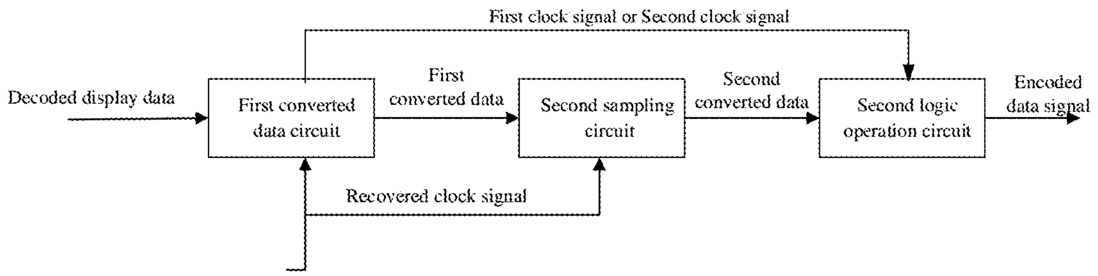
FIG. 11 is a schematic block diagram of an encoding circuit in a LED driver according to an embodiment of the present disclosure.

FIG. 11 shows a schematic block diagram of an encoding circuit in an LED driver according to an embodiment of the present disclosure. The encoding circuit shown in FIG. 11 may be used to perform Manchester encoding on a data stream to generate an encoded data signal.

As shown in FIG. 11, the encoding circuit includes: a first data conversion circuit that converts the decoded display data by using a first clock signal obtained from the recovered clock signal to generate first converted data; a second sampling circuit that samples the first converted data to generate second converted data; and a second logic operation circuit that performs a logic operation on the second converted data and a second clock signal obtained from the recovered clock signal to generate the encoded data signal. Optionally, the first clock signal is same as the second clock signal, or the first clock signal is obtained by phase-delaying the second clock signal.

According to an embodiment of the present disclosure, the first data conversion circuit includes: a first frequency dividing circuit that divides the received recovered clock signal to generate a second clock signal and output the second clock signal as the first clock signal; and a second register that samples the decoded display data by using the first clock signal, and outputs first sampled data; a third register that samples the decoded display data by using a signal that is inverted from the first clock signal, and outputs second sampled data; and a data selector that receives the first sampled data and the second sampled data, and selects, based on a level of the first clock signal, one of the first sampled data and the second sampled data as the first converted data and outputs it to the second sampling circuit.

Optionally, the first data conversion circuit includes: a first frequency dividing circuit that divides the received recovered clock signal to generate a second clock signal; a phase delay circuit that performs phase delay on the second clock signal output by the first frequency dividing circuit, and outputs the phase-delayed second clock signal to a second register and a third register as the first clock signal. In addition, the first data conversion circuit further includes: the second register that samples the decoded display data by using the first clock signal, and outputs first sampled data; the third register that samples the decoded display data by using a signal that is inverted from the first clock signal, and outputs second sampled data; and the data selector that receives the first sampled data and the second sampled data, and selects, based on a level of the first clock signal, one of the first sampled data and the second sampled data as the first converted data and outputs it to the second sampling circuit.

Optionally, the first sampled data is output from a second data output terminal of the second register, and the second sampled data is output from a first data output terminal of the third register.

Optionally, the second sampling circuit includes: a fourth register that samples the first converted data by using a signal that is inverted from the recovered clock signal, and outputs the second converted data.

Optionally, the second logic operation circuit includes: a third logic gate circuit that performs an exclusive OR operation on the second clock signal output by the first frequency dividing circuit and the second converted data to generate the encoded data signal.

Figure 12A:
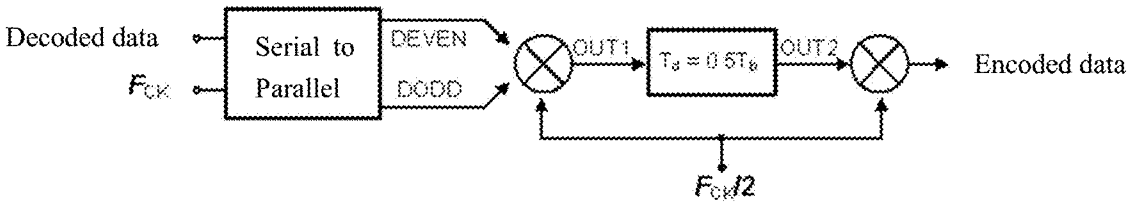
FIGS. 12A-12B are schematic diagrams of an encoding circuit and a corresponding signal timing in a LED driver according to an embodiment of the present disclosure.

As an example, FIG. 12A shows a schematic diagram of an encoding circuit in an LED driver according to an embodiment of the present disclosure. According to an embodiment, in the encoding circuit, after receiving a data stream to be encoded, a first data conversion circuit (for example, including a serial-to-parallel circuit and a corresponding data selector) performs data conversion to the data stream to be encoded by utilizes a recovered clock signal to generate first converted data; a second sampling circuit (for example, including corresponding registers) samples the first converted data to generate second converted data; and a second logic operation circuit generates an encoded data signal by performing an logic operation on the second converted data and a sampling clock obtained from the recovered clock signal.

As shown in FIG. 12A, the data stream to be encoded is converted into a parallel output of odd bits DODD and even bits DEVEN by a serial-to-parallel circuit using the recovered clock signal FCK, and a corresponding data selector is used to select the parallel output odd bits and even bits to generate the first converted data OUT1; the second sampling circuit samples the first converted data OUT1 to generate the second converted data OUT2; and the second logic operation circuit generates the encoded data signal by performing an logic operation on the second converted data OUT2 and the second clock signal obtained from the recovered clock signal.

Figure 12B:
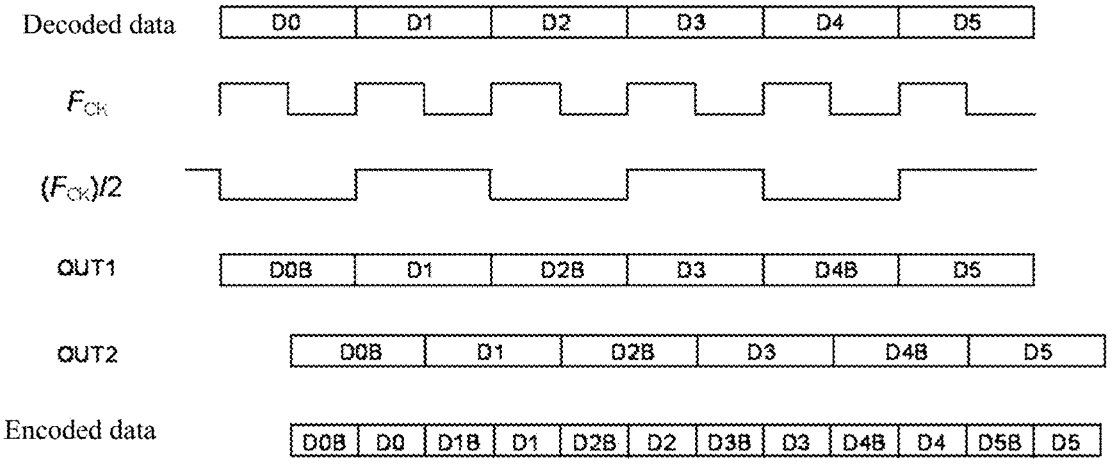

FIG. 12B is a schematic diagram showing a timing of a corresponding signal corresponding to the encoding circuit shown in FIG. 12A. As shown in FIG. 12B, decoded data represents a data stream to be encoded, FCK represents a recovered clock signal, (FCK/2) represents a second clock signal as a sampling clock generated by dividing frequency of the recovered clock signal by 2, OUT1 represents first converted data, OUT2 represents second converted data, and encoded data represents an encoded data signal.

Figure 13:
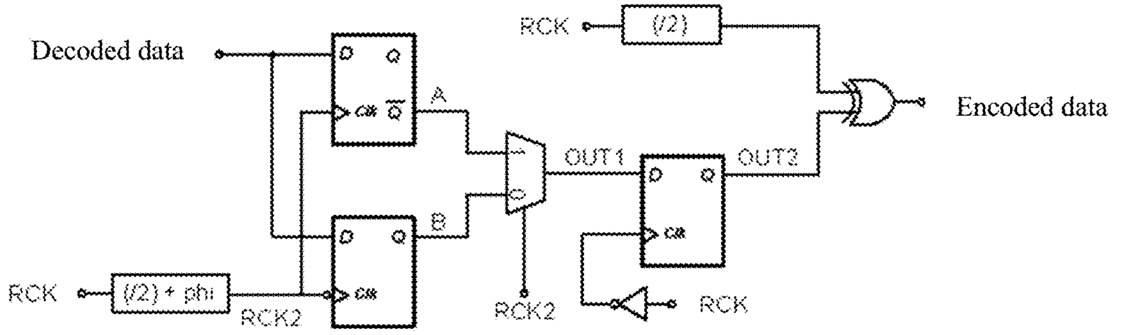
FIG. 13 is a schematic circuit diagram of an encoding circuit in a LED driver according to another embodiment of the present disclosure.

As an example, the process of encoding a data stream may be specifically described in conjunction with the structure of the encoding circuit shown in FIG. 13. As shown in FIG. 13, a data stream to be encoded is input to data terminals of the second register and the third register of the first data conversion circuit; the first frequency dividing circuit divides the frequency of the recovered clock signal RCK by 2 to generate a second clock signal RCK2 and uses it as the first clock signal RCK2 (which is used as a sampling clock); the second register samples the data stream to be encoded by using the first clock signal RCK2, and outputs first sampled data A via its second output terminal /Q; the third register samples the data stream to be encoded by using a signal inverted from the first clock signal RCK2, and outputs second sampled data B via its first output terminal Q; the data selector selects, based on a level of the first clock signal RCK2, one of the first sampled data and the second sampled data as first converted data OUT1 and outputs it to the fourth register of the second sampling circuit; the fourth register samples the first converted data OUT1 by using a signal inverted from the recovered clock signal, and outputs second converted data OUT2; a third logic gate circuit of a second logic operation circuit performs an exclusive OR operation on the second clock signal RCK2 output by the first frequency dividing circuit and the second converted data to generate an encoded data signal.

Optionally, as shown in FIG. 13, a phase delay circuit may also be included. The phase delay circuit performs phase delay phi (π) on the second clock signal output by the first frequency dividing circuit (that is, phase delaying the second clock signal by 1/2 period), and outputs the phase-delayed second clock signal to the second register and the third register as the first clock signal.

Figure 14:
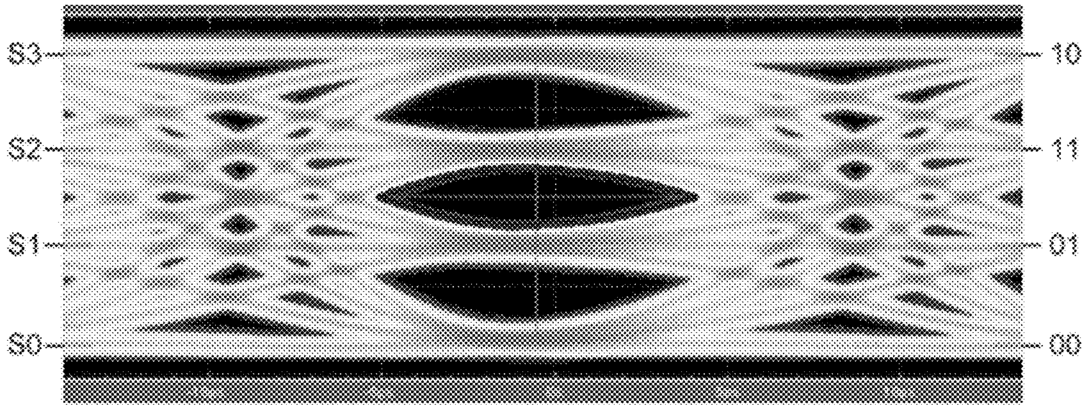
FIG. 14 is a schematic diagram of encoding data by using four-level pulse amplitude modulation (PAM4) according to an embodiment of the present disclosure.

According to an embodiment of the present disclosure, another mode of encoding a data stream is also provided, that is, an encoding mode using four-level pulse amplitude modulation (PAM4). FIG. 14 is a schematic diagram of encoding data using four-level pulse amplitude modulation (PAM4) according to an embodiment of the present disclosure. As shown in FIG. 14, by modulating two bit data on a signal amplitude, four groups of data bits (00, 01, 11, 10) may be corresponded to different amplitudes, so as to achieve compression encoding of the data stream, as well as realize the benefit of using only half the bandwidth.

According to an embodiment of the present disclosure, there is provided a decoding circuit for decoding a data signal encoded by the PAM4 encoding format. The decoding circuit includes a preprocessing circuit that preprocesses the received data signal and outputs a preprocessed data signal; a comparator circuit that compares the preprocessed data signal with a corresponding threshold signal to generate a corresponding bit thermometer code; a PAM4 decoder that decodes the bit thermometer code and outputs a decoded data signal.

Optionally, the comparator circuit includes: a first comparator, a second comparator, and a third comparator, where the first, second and third comparators set different threshold signals, and compare the preprocessed data signal with the different threshold signals, respectively, to generate corresponding bit thermometer codes.

Optionally, the decoding circuit further includes a clock recovery circuit and a second data conversion circuit, where the clock recovery circuit receives a bit thermometer code output from one of the first, second and third comparators, extracts the recovered clock signal therefrom and outputs it to the second data conversion circuit; the second data conversion circuit converts the decoded data signal output by the PAM4 decoder by using the recovered clock signal to generate the decoded display data in a 2-tuple representation form, that is, the decoded display data includes two elements.

Optionally, the second data conversion circuit includes: a fifth register and a sixth register that sample the decoded data signal output by the PAM4 decoder by using the recovered clock signal, to output third sampled data and fourth sampled data respectively as the decoded display data in the-tuple representation form, that is, the third sampled data and fourth sampled data are two elements of the decoded display data.

For example, as shown in FIG. 14, since bit groups 00, 01, 11, and 10 of the data stream are respectively encoded to different voltage amplitude references using the PAM4 encoding mode, after the encoded PAM4 data signal is received, it may be amplified and equalized by a first stage of amplifier, and then quantized by three sets of comparators with different thresholds, so as to convert the PAM4 encoded signal into a bit thermometer code, which is then converted into a binary code form by a thermometer code to binary code decoder, to complete the conversion of the signal with multiple voltage references to a binary voltage reference signal, and generate a recovered data stream by sampling the binary voltage reference signal using a recovered clock signal generated by a clock data recovery circuit CDR. Although not explicitly shown in FIG. 15, optionally, before the amplifier of the decoding circuit, a corresponding signal preprocessor circuit may be provided, for example, to perform preprocessing such as signal shaping, equalization and the like on received PAM4 encoded data signals. Of course, these preprocessing may also be performed in combination with amplification processing of signals.

Figure 15:
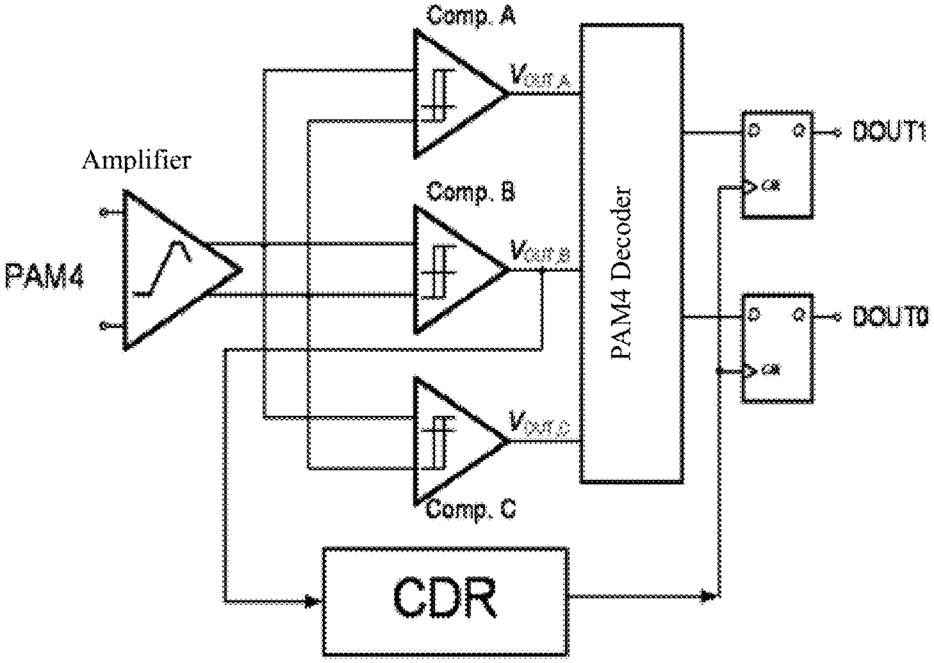
FIG. 15 is a schematic diagram showing a decoding circuit for decoding a PAM4-encoded data signal according to an embodiment of the present disclosure.

FIG. 15 is a schematic diagram showing a decoding circuit for decoding a PAM4-encoded data signal according to an embodiment of the present disclosure. As shown in FIG. 15, a received PAM4 encoded data signal is amplified by an amplifier (as described above, preprocessing such as signal shaping and equalization may be performed together), and the amplified signal is sent to three sets of comparators comp.A, comp.B and comp.C for comparison and quantification. Since the three sets of comparators are set with different thresholds, they may output different bit thermometer code according to an amplitude of the received amplified signal, and output the different bit thermometer code to a thermometer code to binary code decoder (e.g., the PAM4 decoder shown in FIG. 15), to convert them to a corresponding binary voltage reference. In addition, as shown in FIG. 15, a Clock and Data Recovery circuit (CDR) is used to extract a recovered clock signal with a correct frequency and phase from, for example, a bit thermometer code VOUT.B output by the second set of comparator, and the binary data signal output by the thermometer code to binary code decoder is sampled by using the recovered clock signal, for example, by using the recovered clock signal as a sampling clock of the fifth and sixth registers to sample the binary data signal output by the bit thermometer code to binary code decoder, thereby realizing data recovery.

According to an embodiment of the present disclosure, different encoding modes may be adopted between various stages of LED drivers, and conversion between different encoding and decoding modes may be realized via corresponding interface circuits. Taking conversion of Manchester encoding to PAM4 encoding as an example, a combination of Manchester decoder plus PAM4 encoder may be adopted. In other words, a Manchester decoder may be adopted to decode a received data signal encoded in Manchester encoding mode to obtain a data stream to be transmitted; then, a PAM4 encoder may be adopted to encode the data stream to be transmitted, and transmit the encoded data signal to a next stage of LED driver. Conversely, when converting PAM4 encoding to Manchester encoding, a combination of PAM4 decoder plus Manchester encoder may be adopted. Specifically, a PAM4 decoder may be adopted to decode a received data signal encoded in PAM4 encoding mode to obtain a data stream to be transmitted; and then a Manchester encoder may be adopted to encode the data stream to be transmitted, and transmit the encoded data signal to a next stage of LED driver.

In addition, it should be noted that although the present disclosure lists as an example that the Manchester encoding mode and the PAM4 encoding mode may be used to perform encoding and corresponding decoding of a data stream to be transmitted, the technical solution of the present disclosure is not limited to these two encoding modes, but may encompass other types of encoding modes, as long as the corresponding encoding modes can realize encoding of the data stream so as to embed a clock signal into the encoded data signal, and can recover the data stream and clock signal when the encoded data signal is decoded.

Figure 16:
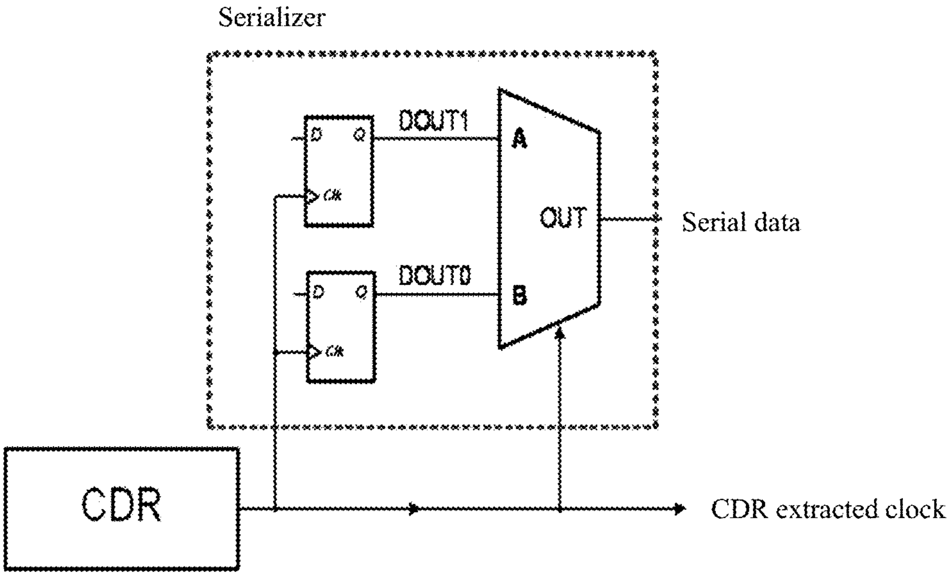
FIG. 16 is a schematic diagram of an interface circuit between an encoding circuit and a decoding circuit according to an embodiment of the present disclosure.

As an example, FIG. 16 shows a schematic interface circuit between an encoding circuit and a decoding circuit according to an embodiment of the present disclosure. As shown in FIG. 16, recovered data and a recovered clock signal generated by a PAM4 decoder pass through a set of serializers to generate serial data, and the generated serial data and the recovered clock signal are transmitted to the encoding circuit as shown in FIG. 12A, thereby completing conversion from PAM4 encoding to Manchester encoding after encoding of the serial data and the recovered clock signal.

Figure 17:
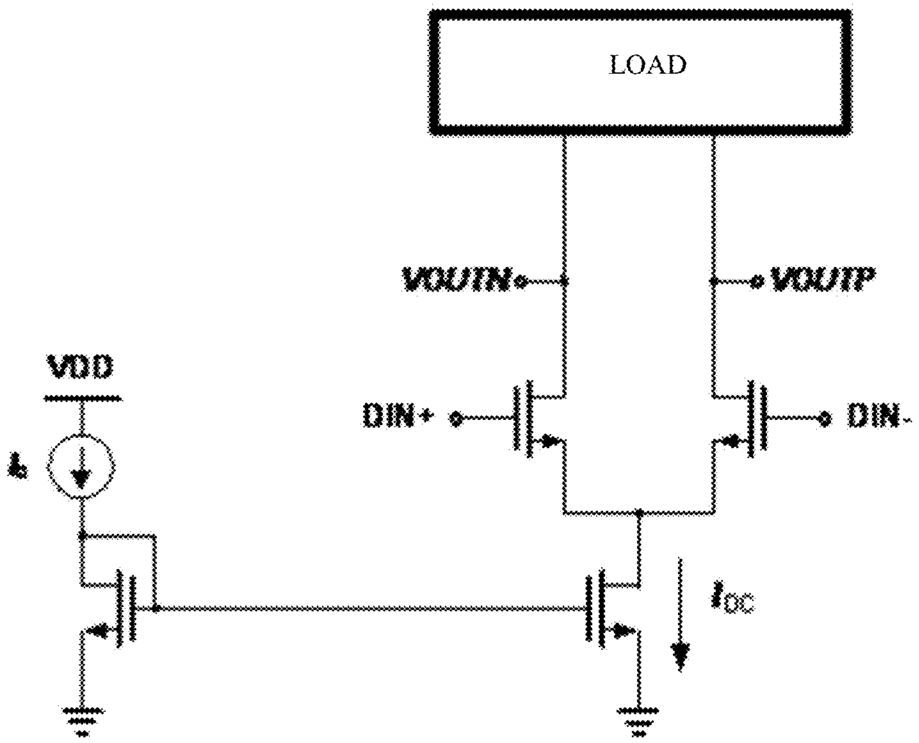
FIG. 17 is a schematic diagram of a receiver RX that receives data in an LED driver according to an embodiment of the present disclosure.

As an example, FIG. 17 shows a specific circuit that may be used for the receiver RX shown in FIG. 4 and/or FIG. 5. As shown in FIG. 17, the receiver may adopt a form of a differential circuit, in which the data signal DATA as shown in FIG. 3 may be received via DIN+ and/or DIN− terminals shown in FIG. 17, and the signal output by the receiver RX is provided to a corresponding decoder via VOUTN and VOUTP terminals. As an example, the data signal received by the receiver may be a single-ended signal or a double-ended differential signal, and the signal output by the receiver may also be a single-ended signal or a double-ended signal (such as a differential signal).

Figure 18:
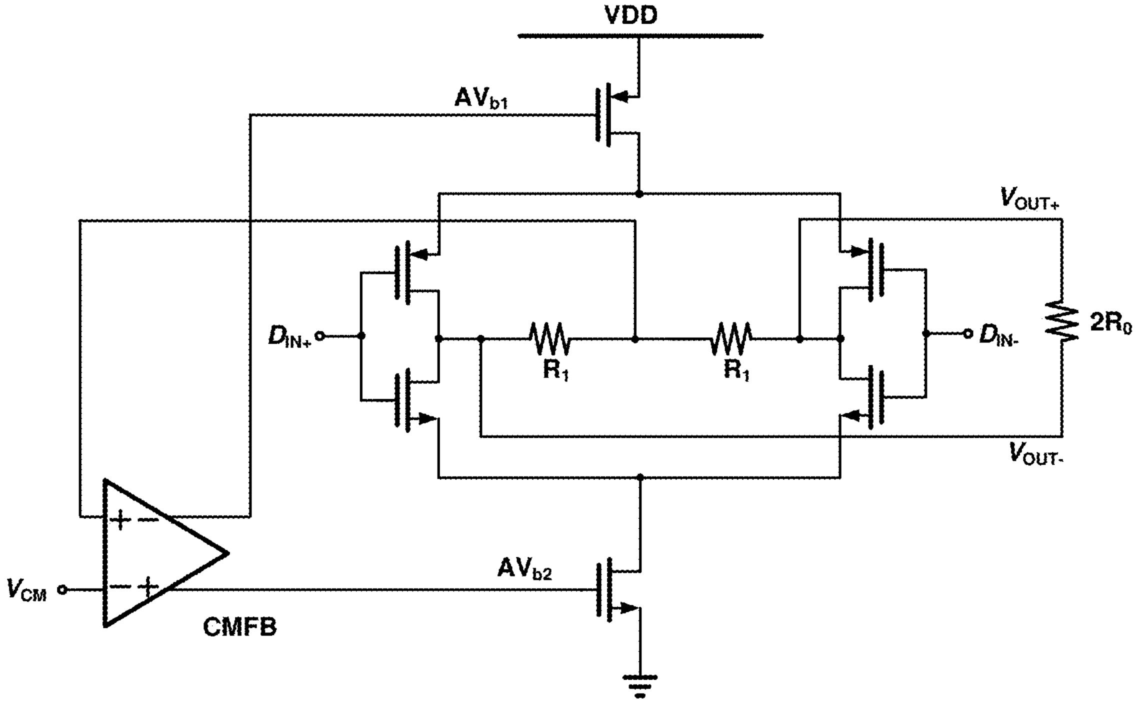
FIG. 18 is a schematic diagram of a transmitter TX that transmits data in an LED driver according to an embodiment of the present disclosure.

As an example, FIG. 18 shows a specific circuit that may be used for the transmitter TX shown in FIG. 4 and/or FIG. 5. As shown in FIG. 18, the transmitter may adopt a form of a fully differential circuit, in which the encoded data as shown in FIG. 4 and/or FIG. 5 may be received via DIN+ and/or DIN− terminals shown in FIG. 18, and the signal may be output to a receiver RX of a next stage of LED driver via Vout+ and Vout− terminals (for example, they may correspond to the SDOUT pins shown in FIG. 3). As an example, the encoded data signal may be a single-ended signal or a double-ended signal (for example, a differential signal).

According to the LED driver and the corresponding LED driving device proposed in the present disclosure, it is no longer necessary to transmit clock signals separately, but embed a clock signal into a data signal by corresponding encoding of the data signal transmitted between various stages of LED drivers, thereby eliminating hardware settings for separate transmission of clock signals between various stages of LED drivers, reducing wiring complexity of a printed circuit board, and reducing the cost of a product; in addition, power consumption and electromagnetic interference of the LED driving device may also be reduced, thereby improving display quality of the LED.

This application describes various aspects including tools, features, embodiments, models, methods and the like. Many of these aspects are specifically described, at least to illustrate the individual features, and they are often described in a way that may sound to be limited. However, this is for the purpose of clear description, and does not limit application or scope of those aspects. In fact, all the different aspects may be combined and interchanged to provide other aspects. In addition, these aspects may also be combined and interchanged with aspects described in previous applications.

When the drawings are presented as flowcharts, it should be understood that they also provide block diagrams of corresponding apparatuses. Similarly, when the drawings are presented as block diagrams, it should be understood that they also provide flowcharts of corresponding methods/processes.

The implementations and aspects described herein may be implemented in, for example, methods or processing, apparatuses, software programs, data streams, or signals. Even if only discussed in the context of a single implementation form (for example, discussed only as a method), the implementation of the discussed features may also be implemented in other forms (for example, an apparatus or a program). The apparatus may be implemented in, for example, appropriate hardware, software, and firmware. The method may be implemented in, for example, a processor, which generally refers to a processing device, including, for example, a computer, a microprocessor, an integrated circuit, or a programmable logic device. Processors also include communication devices such as computers, cellular phones, portable/personal digital assistants ("PDAs"), and other devices that facilitate communication of information between end users.

References to "one embodiment" or "an embodiment" or "one implementation" or "an implementation" and other variations thereof mean that specific features, structures, characteristics, etc. described in conjunction with the embodiment are included in at least one embodiment. Therefore, appearance of the phrase "in one embodiment" or "in an embodiment" or "in one implementation" or "in an implementation" and any other variations in various places throughout the document does not necessarily all refer to the same embodiment.

Many embodiments are described. The features of these embodiments may be provided individually or in any combination. In addition, the embodiments may include one or more of the following features, devices, or aspects across various claim categories and types, alone or in any combination.

Furthermore, when specific features, structures, or characteristics are described in conjunction with an embodiment, it may be considered that implementing such features, structures, or characteristics in combination with other embodiments (whether explicitly described or not) is within the knowledge of those skilled in the art.

Many implementations have been described. However, it should be understood that various modifications may be made to them. For example, elements of different implementations may be combined, supplemented, modified, or removed to produce other implementations. In addition, those of ordinary skill in the art may understand that other structures and processes may be used in place of the disclosed structures and processes, and the resulting implementations will perform at least substantially the same functions in at least substantially the same way to achieve at least substantially the same result as the disclosed implementations. Therefore, this application considers these and other implementations.

What is claimed is:

1. A light-emitting diode LED driver, comprising:

a decoding circuit that receives a data signal and decodes the data signal to generate display data used to drive LEDs to emit light and display and a recovered clock signal; and an encoding circuit that encodes the decoded display data by using the recovered clock signal to generate an encoded data signal, wherein the data signal is encoded in a first encoding format, the encoded data signal is encoded in a second encoding format, and the first encoding format and the second encoding format are different encoding formats, wherein at least one of the first encoding format and the second encoding format is one of a Manchester encoding format and a four-level pulse amplitude modulation (PAM4) encoding format.

2. The LED driver according to claim 1, wherein when the first encoding format is the Manchester encoding format, the decoding circuit comprises:

a first delay circuit that delays a timing of the received data signal to generate a first recovered data signal;

a first sampling circuit that samples the received data signal to generate a second recovered data signal; and a first logic operation circuit that performs a logic operation on the first recovered data signal and the second recovered data signal to generate the decoded display data and the recovered clock signal;

wherein the first sampling circuit samples the received data signal by using the recovered clock signal.

3. The LED driver according to claim 2, wherein the first delay circuit delays the received data signal by 1/4 period to generate the first recovered data signal.

4. The LED driver according to claim 3, wherein the first sampling circuit comprises:

a second delay circuit that receives the recovered clock signal generated by the first logic operation circuit, and delays the recovered clock signal by 1/2 period to generate a sampling clock signal; and a first register that samples the received data signal by using the sampling clock signal to generate the second recovered data signal.

5. The LED driver according to claim 4, wherein the first logic operation circuit comprises:

a first logic gate circuit that performs an exclusive OR operation on the first recovered data signal and the second recovered data signal to generate the recovered clock signal; and a second logic gate circuit that inverts the second recovered data signal to generate the decoded display data.

6. The LED driver according to claim 1, wherein when the second encoding format is the Manchester encoding format, the encoding circuit comprises:

a first data conversion circuit that converts the decoded display data by using a first clock signal obtained from the recovered clock signal to generate first converted data;

a second sampling circuit that samples the first converted data to generate second converted data; and a second logic operation circuit that performs a logic operation on the second converted data and a second clock signal obtained from the recovered clock signal to generate the encoded data signal.

7. The LED driver according to claim 6, wherein the first data conversion circuit comprises:

a first frequency dividing circuit that divides the received recovered clock signal to generate a second clock signal, and outputs the second clock signal as a first clock signal;

a second register that samples the decoded display data by using the first clock signal, and outputs first sampled data;

a third register that samples the decoded display data by using a signal that is inverted from the first clock signal, and outputs second sampled data; and a data selector that receives the first sampled data and the second sampled data, and selects, based on a level of the first clock signal, one of the first sampled data and the second sampled data as the first converted data and outputs it to the second sampling circuit.

8. The LED driver according to claim 6, wherein the first data conversion circuit comprises:

a first frequency dividing circuit that divides the received recovered clock signal to generate a second clock signal;

a phase delay circuit that performs phase delay on the second clock signal output by the first frequency dividing circuit, and outputs the phase-delayed second clock signal as the first clock signal;

a second register that samples the decoded display data by using the first clock signal, and outputs first sampled data;

a third register that samples the decoded display data by using a signal that is inverted from the first clock signal, and outputs second sampled data; and a data selector that receives the first sampled data and the second sampled data, and selects, based on a level of the first clock signal, one of the first sampled data and the second sampled data as the first converted data and outputs it to the second sampling circuit.

9. The LED driver according to claim 6, wherein the second sampling circuit comprises:

a fourth register that samples the first converted data by using a signal that is inverted from the recovered clock signal, and outputs the second converted data.

10. The LED driver according to claim 7, wherein the second logic operation circuit comprises:

a third logic gate circuit that performs an exclusive OR operation on the second clock signal output by the first frequency dividing circuit and the second converted data to generate the encoded data signal.

11. The LED driver according to claim 8, wherein the second logic operation circuit comprises:

a third logic gate circuit that performs an exclusive OR operation on the second clock signal output by the first frequency dividing circuit and the second converted data to generate the encoded data signal.

12. The LED driver according to claim 1, wherein when the first encoding format is the PAM4 encoding format, the decoding circuit comprises:

a preprocessing circuit that preprocesses the received data signal and outputs a preprocessed data signal;

a comparator circuit that compares the preprocessed data signal with corresponding threshold signals to generate a corresponding bit thermometer code;

a PAM4 decoder that decodes the bit thermometer code and outputs a decoded data signal.

13. The LED driver of claim 12, wherein the comparator circuit comprises:

a first comparator, a second comparator and a third comparator, wherein the first, second and third comparators set different threshold signals, and compare the preprocessed data signal with the different threshold signals, respectively, to generate corresponding bit thermometer codes.

14. The LED driver according to claim 13, wherein the decoding circuit further comprises a clock recovery circuit and a second data conversion circuit, wherein, the clock recovery circuit receives a bit thermometer code output from one of the first, second and third comparators, extracts the recovered clock signal therefrom and outputs it to the second data conversion circuit;

the second data conversion circuit converts the decoded data signal output by the PAM4 decoder by using the recovered clock signal to generate the decoded display data in a 2-tuple representation form.

15. The LED driver of claim 14, wherein the second data conversion circuit comprises:

a fifth register and a sixth register that sample the decoded data signal output by the PAM4 decoder by using the recovered clock signal, to output third sampled data and fourth sampled data respectively as the decoded display data in the 2-tuple representation form.

16. The LED driver according to claim 15, wherein when the first encoding format adopts the PAM4 encoding format and the second encoding format adopts the Manchester encoding format, the decoding circuit further comprises:

an interface circuit that receives the third sampled data and the fourth sampled data, and selects one of the third sampled data and the fourth sampled data as the decoded display data based on a level of the recovered clock signal.

17. A light-emitting diode LED driving device, comprising N stages of LED drivers connected in series, wherein each stage of LED driver is the LED driver according to claim 1, wherein a first stage of LED driver receives an initial data signal and outputs a first stage of data signal, a k-th stage of LED driver receives a (k−1)-th stage of data signal output by a (k−1)-th stage of LED driver and outputs a k-th stage of data signal, $1<k \leq N$.

* * * * *